United States Patent [19]

Takano

[11] Patent Number: 5,121,416
[45] Date of Patent: Jun. 9, 1992

[54] TIMING EXTRACTING METHOD SUITABLE FOR A HIGH BIT-RATE TRANSMISSION SYSTEM AND A CIRCUIT THEREFOR

[75] Inventor: Isamu Takano, Tokyo, Japan
[73] Assignee: NEC Corporation, Tokyo, Japan
[21] Appl. No.: 404,718
[22] Filed: Sep. 8, 1989

[30] Foreign Application Priority Data

Sep. 27, 1988 [JP] Japan ................... 63-241969

[51] Int. Cl.⁵ ............................ H04L 7/02
[52] U.S. Cl. ..................... 375/110; 328/16; 328/30
[58] Field of Search ............... 360/51; 375/110, 118, 375/3, 4, 108, 20, 106, 111; 370/105.3; 331/76; 328/120, 16, 15, 30, 38.1

[56] References Cited

U.S. PATENT DOCUMENTS

| | | | |
|---|---|---|---|
| 3,986,126 | 10/1976 | Gindi et al. | 375/106 |
| 4,317,212 | 2/1982 | Van Gerwen et al. | 375/20 |
| 4,466,110 | 8/1984 | Kizaki et al. | 328/120 |
| 4,737,980 | 4/1988 | Viola et al. | 375/106 |

OTHER PUBLICATIONS

S. L. Larner et al., "A 565-Mbit/sec Monomode Transmission System", Optical Fiber Communication, Feb. 13, 1985, pp. 84–86.

Takano and Akashi, A 1/N Countdown Timing Extraction Circuit for a Gigabit Optical Fiber Transmission System, Fourteenth European Conference on Optical Communication, pp. 195–198, (Sep. 11, 1988).

Primary Examiner—Benedict V. Safourek
Assistant Examiner—Tesfaldet Bocure
Attorney, Agent, or Firm—Sughrue, Mion, Zinn, Macpeak & Seas

[57] ABSTRACT

A method and circuit for extracting a timing clock in a Pulse Code Modulation (PCM) system capable of transmitting data at a rate which is on the order of a gigabit per second. A first clock signal is produced by extracting a fundamental frequency component from the received signal. A frequency-divided clock signal is produced by dividing the first clock signal by a predetermined division ratio. A second clock signal is produced by extracting a frequency component of the frequency-divided clock signal. The extracted clock signal is generated by multiplying the second clock signal by a ratio which corresponds to the division ratio.

5 Claims, 1 Drawing Sheet

TIMING EXTRACTING METHOD SUITABLE FOR A HIGH BIT-RATE TRANSMISSION SYSTEM AND A CIRCUIT THEREFOR

BACKGROUND OF THE INVENTION

The present invention relates to a timing extracting method for use in a PCM (Pulse Code Modulation) transmission system and a circuit therefor and, more particularly, to a method and a circuit for timing extraction applicable to a PCM transmission system capable of transmitting data at the gigabit per second (Gb/s) order.

In parallel with the progress of optical transmission technologies, an ultra high-speed optical transmission system of the type using an optical device operable at a long wavelength band and a single-mode optical fiber is attracting much attention as a promising high-capacity long-haul transmission system. Especially, high-speed and stable optical transmission equipment is indispensable for a broad-band communication network which implements various kinds of services involving data, picture and speech. Such a broad-band communication network has a fundamental transmission system whose transmission capacity is extremely high, e.g. several gigabits per second in a time division multiplex communication system. The network, therefore, needs broadband high-speed optical transmitting and receiving units. Usually, a receiving unit included in terminal equipment has a timing circuit for defining the center of an eye pattern so that an equalized waveform may be identified correctly. In a PCM regenerative repeater, the timing circuit generally includes a timing extracting circuit which extracts a timing component or information from a received code stream.

For the timing extraction, it has been customary to feed an NRZ (Non-Return to Zero) code or similar received signal having no timing component to the timing extraction circuit via a differentiator or a double-wave rectifier, while feeding an RZ (Return to Zero) code or similar code having a timing component directly to the timing extraction circuit. An element used for a timing extraction is implemented by a SAW (Surface Acoustic Wave) filter, for example. Since timing deviation is one of the critical characteristics of a timing extracting element, the SAW filter is provided with a quality factor Q of the order of 800 in consideration of the temperature characteristic, aging, detuning, and so forth. For details of this kind of timing extracting circuit, a reference may be made to "A 565-Mbit/sec monomode transmission system" reported by D. S. Larner et al. at Optical Fiber Communication (OFC) on Feb. 13, 1985.

The prior art timing extraction circuit using a timing extraction filter in the form of a SAW filter and generating a clock signal whose frequency falls in the gigahertz range directly as stated above has some problems left unsolved. Specifically, the frequency range available with the circuit is limited in relation to the fine machining of the electrodes of the SAW filter, and the yield is low due to the inherent fabrication process. More specifically, in a SAW filter, an excited surface wave has a fundamental frequency $f_0$ which is determined by the surface wave propagation rate V and the electrode pitch L, i.e. $f_0 = V/L$. Generally, the surface wave propagation rate V is $3 \times 10^8$ (meters per second). It follows that for an exciting frequency lying in the gigahertz range a SAW filter having electrodes which are less than 1 micron wide has to be fabricated. A SAW filter used in a 4 Gb/sec optical regenerative repeater, for example, has electrodes each being formed on a quartz substrate and provided with a width of 0.2 microns and a length of 400 microns. It is difficult to fabricate a SAW filter having such an accurate electrode width due to the limits of photoetching, laser machining and similar technologies. This obstructs the realization of a PCM signal receiving unit in the gigabit per second range.

SUMMARY OF THE INVENTION

It is therefore an object of the present invention to provide a method and circuit for timing extraction which are advantageously applicable to a high bit-rate transmission system and, yet, easy to implement.

It is another object of the present invention to provide a clock extracting circuit which maintains stable characteristics even when it continuously receives data of the same symbol.

In accordance with the present invention, a method of extracting a fundamental frequency component from a received signal and generating an extracted clock signal having the fundamental frequency comprises the steps of producing a first clock signal by extracting the fundamental frequency component from the received signal. A frequency-divided clock signal is produced by dividing the first clock signal by a predetermined division ratio. A second clock signal is produced by extracting a frequency component of the frequency-divided clock signal. The extracted clock signal is generated by multiplying the second clock signal by a ratio which corresponds to the division ratio.

Also, in accordance with the present invention, a circuit for extracting a fundamental frequency component from a received signal and outputting an extracted clock signal having the fundamental frequency comprises a first filter for producing a first clock signal by extracting the fundamental frequency component from the received signal. A frequency divider produces a frequency-divided clock signal by dividing the first clock signal by a predetermined division ratio. A second filter produces a second clock signal by extracting a frequency component of the frequency-divided clock signal. A multiplier produces the extracted clock signal by multiplying the second clock signal by a ratio which corresponds to the division ratio.

BRIEF DESCRIPTION OF THE DRAWINGS

The above and other objects, features and advantages of the present invention will become more apparent from the following detailed description when taken with accompanying drawings in which.

DETAILED DESCRIPTION OF THE PREFERRED EMBODIMENTS

Figure 1:
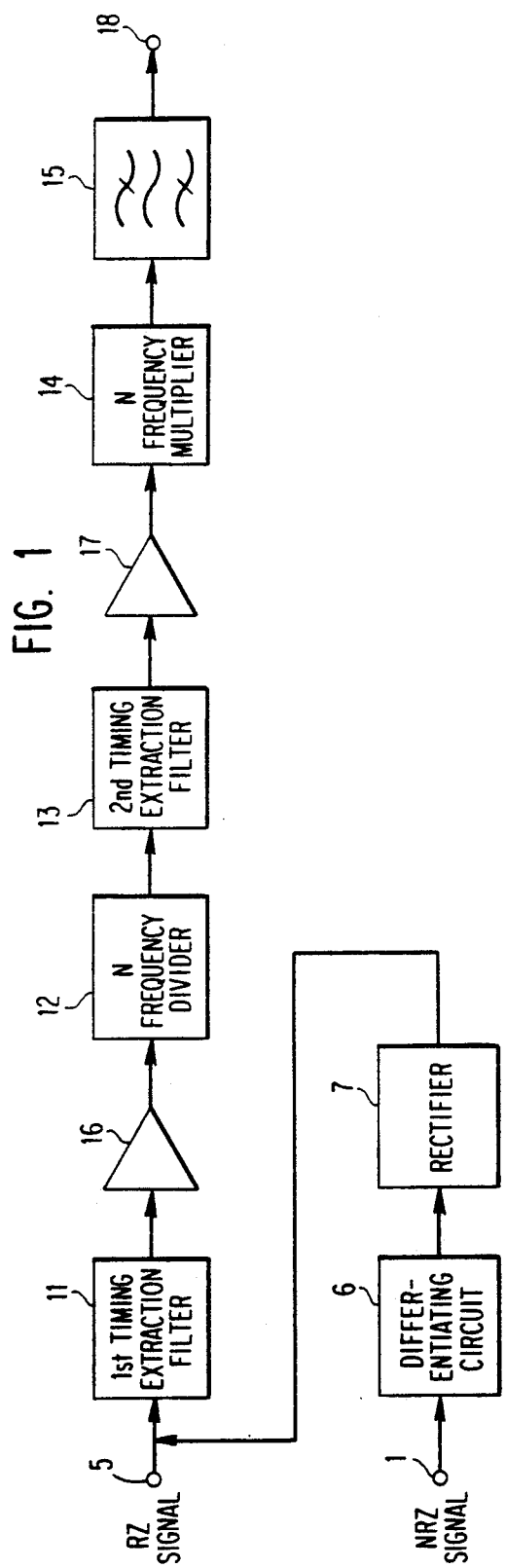
FIG. 1 is a schematic block diagram showing a timing extraction circuit embodying the present invention.

Referring to FIG. 1 of the drawings, a timing extraction circuit embodying the present invention is shown in a block diagram. In the illustrative embodiment, assume that a received equalized waveform has undergone RZ coding. As shown, the timing extraction circuit has an input terminal 5 to which an equalized RZ signal (hereinafter simply referred to as an RZ signal) is applied.

The RZ signal is fed from the input terminal 5 to a first timing extraction filter 11. The extraction filter 11 roughly extracts a clock signal whose frequency is a fundamental clock frequency $f_0$ of the RZ signal, thereby producing a first extracted clock signal. Therefore, the extraction filter 11 has a quality factor Q which is selected in consideration of the quality factor Q of a second timing extraction filter, which will be described, and the amount of jitter of a resulting clock signal. The extraction filter 11 may be implemented as a microstripline filter whose Q may be 100 for an input signal of 2.4 Gb/sec, for example.

The first extracted clock signal of the rough $f_0$ component is fed from the first extraction filter 11 to an N frequency divider 12 via a first limiter amplifier 16. The first limiter amplifier 16 serves to suppress the fluctuation of the clock signal amplitude ascribable to the fluctuation of the mark ratio of the RZ signal. The N frequency divider 12 divides the first extracted clock signal by a predetermined division ratio N so as to produce a divided clock signal.

A second timing extraction filter 13 extracts from the above-mentioned divided clock signal a second extracted clock signal having a frequency of $f_0/N$ and a stable characteristic. Assuming that the clock frequency to be extracted from the received RZ signal is 2.4 gigahertz, and that the division ratio N is 4, then the first extracted clock signal applied to the second extraction filter 13 has a frequency $f_0/N$ of 600 megahertz. For the second timing extraction, use may be made of a SAW filter having a quality factor Q of 800, for example. A SAW filter associated with an input signal of 600 megahertz can be readily fabricated by using ordinary photoetching technology.

The second extracted clock signal outputted by the second extraction filter 13 is fed to a second limiter amplifier 17 for the suppression of amplitude fluctuation. The resulting output of the limiter amplifier 17 is applied to an N frequency multiplier 14. The N frequency multiplier 14 multiplies the frequency of the second extracted clock signal which is $f_0/N$ by N to produce the frequency $f_0$ of the input RZ signal. Usually, the clock signal having the frequency $f_0$ as produced by the N frequency multiplier 14 has a higher harmonic component ascribable to the multiplier 14. A bandpass filter 15 removes such a higher harmonic component as well as low frequency noise from the clock signal. The resulting clock signal having the frequency $f_0$ appears at an output terminal 18.

The present invention is advantageously applicable to a received equalized waveform which has undergone NRZ coding as well. An NRZ signal arriving at an input terminal 1 has no clock components in its spectrum. Hence, an arrangement may be made such that a differentiator 6 and a double-wave rectifier 7 generate a clock component whose frequency is $f_0$, the clock component being fed to the first timing extraction filter 11.

Figure 2:
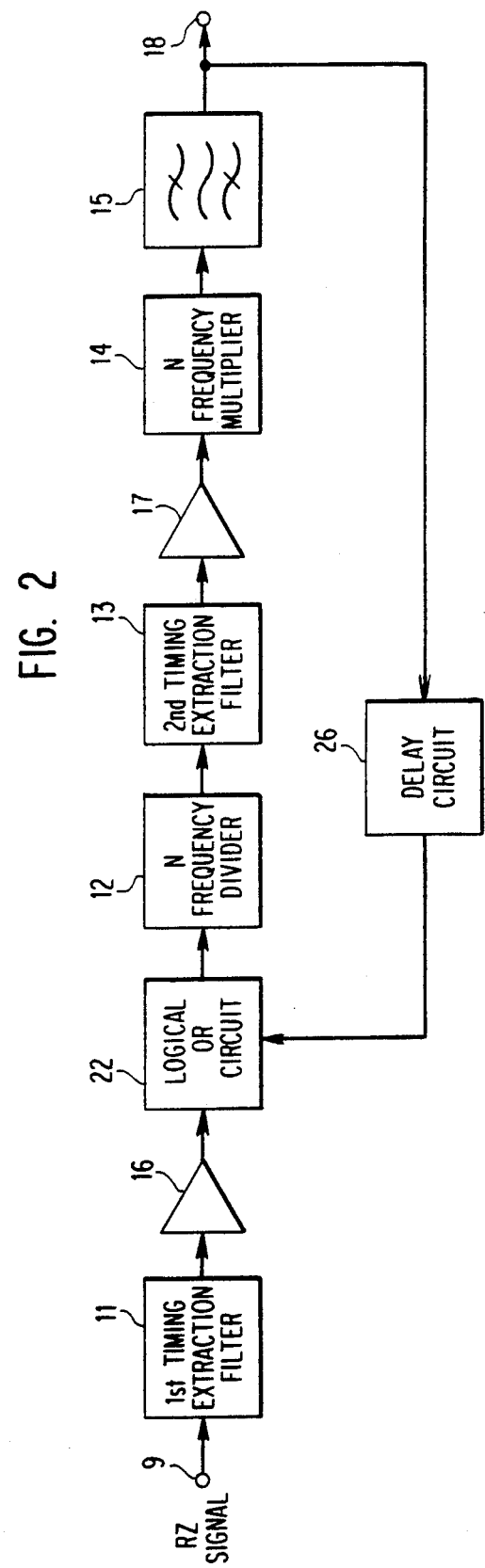
FIG. 2 is a schematic block diagram showing an alternative embodiment of the timing extraction circuit in accordance with the present invention.

FIG. 2 shows another embodiment of the present invention. In this embodiment, it is assumed that RZ coding has been applied to the received signal. The embodiment of FIG. 2 is essentially the same as the embodiment of FIG. 1 except for an OR circuit 22 and a delay circuit 26.

In a timing extraction circuit, the stability of a clock signal is an important consideration in enhancing reliability. For example, in the embodiment of FIG. 1, assume that a signal in the form of a stream of the same symbol, e.g., logical ZERO is received. Then, the first extracted clock signal produced by the first extraction filter 11 will have an amplitude characteristic represented by $V \cdot \exp(-\pi n/Q)$ where V and n are the maximum amplitude of the input to the filter 11 and the number of continuous ZEROs, respectively. Specifically, the amplitude gradually decreases due to the continuous occurrence of ZERO. When the amplitude of the first extracted clock signal becomes lower than the minimum input level of the N frequency divider 12, the N frequency divider 12 will malfunction so as to render the output clock signal unstable, resulting in a device which uses the output clock being effected. The embodiment shown in FIG. 2 eliminates such an occurrence ascribable to the continuation of the same symbol by incorporating the OR circuit 22 and delay circuit 26.

In FIG. 2, the first extracted clock signal roughly extracted by the first extraction filter 11 is applied to the first limiter amplifier 16 for suppressing the amplitude fluctuation thereof. The resulting output of the limiter amplifier 16 is fed to the OR circuit 22. At the same time, the output clock signal from the bandpass filter 15 is fed back to the OR circuit 22 via the delay circuit 26.

At the initial point with respect to time, no signal appears on the output of the delay circuit 26. Hence, the first extraction filter 11 produces an $f_0$ component signal in which the signal component outputted by the filter 11 is predominant. The rough $f_0$ component signal from the OR circuit 22 is divided by the N frequency divider 12 by a ratio N. The frequency-divided signal is routed through the second extraction filter 13, second limiter amplifier 17, N frequency multiplier 12 and bandpass filter 15 to the output terminal 18 as an output clock signal having a stable characteristic.

The stable $f_0$ clock signal appearing at the output terminal 18 is also applied to the delay circuit 26. Delayed by a predetermined period of time by the delay circuit 26, the clock signal is fed to the OR circuit 22. Consequently, an $f_0$ clock signal which is the OR of the stable $f_0$ clock signal from the delay circuit 26 and the rough $f_0$ clock signal from the first extraction filter 11 appears at the output of the OR circuit 22. The circuitry of FIG. 2, therefore, is successful in producing a stable clock signal on the output terminal 18 despite the stream of ZEROs arriving at an input terminal 9.

The embodiment of FIG. 2 is operable not only with an RZ signal but also with an NRZ signal. To process an NRZ signal, the circuitry of FIG. 2 may be so constructed as to couple the signal to the first extraction filter 11 via non-linear means which is constituted by a differentiating circuit and a double-wave rectifier. In the illustrative embodiment shown in FIG. 2, the delay circuit 26 effects a delay which may be selected in consideration of the tolerance of the filter 11 to the continuation of ZERO.

In both of the embodiments shown and described, the frequency division ratio N of the N frequency divider 12 may be determined by taking account of the amount of noise ascribable to the N frequency multiplier 14 which follows the N frequency divider 12 and the ease of fabrication of the second extraction filter 13. When the present invention is built in a time division multiplexing system, for example, the frequency division ratio N may be matched to the number of lower-order bit signals and, in this case, the N frequency multiplier 14 is not necessary.

In summary, it will be seen that the present invention provides a timing extraction circuit which is practicable in the GHz range and withstands the continuous occurrence of the same symbol, thereby enhancing the communication capability.

What is claimed is:

1. A method of generating a reproduced clock signal having a fundamental frequency corresponding to the fundamental frequency component of a received signal, said method comprising the steps of:

producing a first extracted clock signal by extracting said fundamental frequency component from said received signal;

producing a frequency-divided clock signal by frequency-dividing said first extracted clock signal by a predetermined division ratio N;

producing a second extracted clock signal by extracting a frequency component which is equal to one-Nth of said fundamental frequency from said frequency-divided clock signal; and producing said reproduced clock signal by multiplying said second extracted clock signal by a ratio which corresponds to the division ratio.

2. A circuit for extracting a fundamental frequency component from a received signal and outputting a reproduced clock signal having said fundamental frequency, comprising:

first filter means for producing a first extracted clock signal by extracting said fundamental frequency component from said received signal;

frequency dividing means for producing a frequency-divided clock signal by dividing said first extracted clock signal by a predetermined division ratio N;

second filter means for producing a second extracted clock signal by extracting a frequency component which is equal to one-Nth of said fundamental frequency form said frequency-divided clock signal; and multiplying means for producing said reproduced clock signal by multiplying said second extracted clock signal by a ratio which corresponds to said division ratio.

3. A circuit as claimed in claim 2, wherein said second filter means comprises a SAW (Surface Acoustic Wave) filter.

4. A circuit as claimed in claim 2, wherein said second filter means has a quality factor greater then said first filter means.

5. A circuit as claimed in claim 2, further comprising:

delay means for delaying said reproduced clock signal by a predetermined amount to produce a delayed reproduced clock signal; and logical OR means for performing an OR operation of said first extracted clock signal and said delayed reproduced clock signal and outputting a resulting composite signal to said frequency dividing means as said first extracted clock signal.

* * * * *